United States Patent
Fukuzaki et al.

(10) Patent No.: US 11,393,222 B2
(45) Date of Patent: Jul. 19, 2022

(54) VEHICLE MANAGEMENT SYSTEM, VEHICLE-MOUNTED DEVICE, VEHICLE MANAGEMENT METHOD, AND PROGRAM

(71) Applicant: MITSUBISHI HEAVY INDUSTRIES MACHINERY SYSTEMS, LTD., Hyogo (JP)

(72) Inventors: Shigetaka Fukuzaki, Tokyo (JP); Etsuji Nishimae, Tokyo (JP)

(73) Assignee: MITSUBISHI HEAVY INDUSTRIES MACHINERY SYSTEMS, LTD., Hyogo (JP)

( * ) Notice: Subject to any disclaimer, the term of this patent is extended or adjusted under 35 U.S.C. 154(b) by 364 days.

(21) Appl. No.: 16/498,649

(22) PCT Filed: Mar. 30, 2017

(86) PCT No.: PCT/JP2017/013400
§ 371 (c)(1),
(2) Date: Sep. 27, 2019

(87) PCT Pub. No.: WO2018/179279
PCT Pub. Date: Oct. 4, 2018

(65) Prior Publication Data
US 2020/0034642 A1  Jan. 30, 2020

(51) Int. Cl.
*G06V 20/58* (2022.01)
*B60Q 9/00* (2006.01)
(Continued)

(52) U.S. Cl.
CPC ........... *G06V 20/584* (2022.01); *B60Q 9/005* (2013.01); *B60W 30/16* (2013.01); *G08G 1/04* (2013.01)

(58) Field of Classification Search
USPC .............................. 382/103, 181; 340/425.5
See application file for complete search history.

(56) References Cited

U.S. PATENT DOCUMENTS

| 9,911,245 B1* | 3/2018 | Geist | ................... G07B 15/063 |
| 2002/0008638 A1 | 1/2002 | Yamashita | |

(Continued)

FOREIGN PATENT DOCUMENTS

| JP | 2001338317 A | 12/2001 |
| JP | 2002024888 A | 1/2002 |

(Continued)

OTHER PUBLICATIONS

International Search Report and Written Opinion of International Application No. PCT/JP2017/013400 dated Jul. 4, 2017; 14pp.

*Primary Examiner* — Kathleen Y Dulaney
(74) *Attorney, Agent, or Firm* — Kanesaka Berner and Partners LLP (57) ABSTRACT

A vehicle-mounted device is configured to identify another vehicle from an image generated by photographing the surroundings of a host vehicle using a photographing device. The vehicle-mounted device is configured to detect identification information of the another vehicle on the basis of a signal received via inter-vehicle communication with a vehicle-mounted device of the another vehicle located in a communication range of the inter-vehicle communication. The vehicle-mounted device is configured to determine whether the identification information corresponding to the another vehicle identified from an image has been acquired.

4 Claims, 5 Drawing Sheets

(51) Int. Cl.
  *B60W 30/16* (2020.01)
  *G08G 1/04* (2006.01)

(56) References Cited

U.S. PATENT DOCUMENTS

| | | | | |
|---|---|---|---|---|
| 2007/0263901 | A1* | 11/2007 | Wu | G06V 20/584 |
| | | | | 382/104 |
| 2008/0215232 | A1* | 9/2008 | Ikeda | G08G 1/164 |
| | | | | 701/532 |
| 2011/0043341 | A1* | 2/2011 | Kumagami | H04N 5/23222 |
| | | | | 340/425.5 |
| 2016/0332574 | A1* | 11/2016 | Park | H04N 7/181 |
| 2018/0268238 | A1* | 9/2018 | Khan | G06F 16/51 |
| 2020/0380277 | A1* | 12/2020 | Xie | G06V 20/584 |

FOREIGN PATENT DOCUMENTS

| | | |
|---|---|---|
| JP | 2012133429 A | 7/2012 |
| JP | 2013058140 A | 3/2013 |

\* cited by examiner

VEHICLE MANAGEMENT SYSTEM, VEHICLE-MOUNTED DEVICE, VEHICLE MANAGEMENT METHOD, AND PROGRAM

RELATED APPLICATIONS

The present application is a National Phase of International Application Number PCT/JP2017/013400 filed on Mar. 30, 2017.

TECHNICAL FIELD

The present invention relates to a vehicle management system, a vehicle-mounted device, a vehicle management method, and a program.

BACKGROUND ART

A technology in which a vehicle-mounted device mounted on a vehicle performs wireless communication with a roadside device installed on a roadside strip of a lane and a fee calculation device determines a vehicle passing a plurality of roadside devices installed with intervals therebetween to charge a toll for the vehicle according to passing these roadside devices has been disclosed. For example, Patent Document 1 discloses a technology for performing normal fee charging on vehicles entering an area at which fee charging is required in a non-stop manner using road-to-vehicle wireless communication.

CITATION LIST

Patent Literature

[Patent Document 1]
Japanese Unexamined Patent Application, First Publication No. 2013-338317

SUMMARY OF INVENTION

Technical Problem

Incidentally, if it is possible to detect a travel route based on a position of a vehicle obtained by a mechanism such as a GPS even if a roadside device is not provided in a roadside strip with respect to a lane, the fee calculation device can calculate a fee for a travel section of a vehicle. However, it may not be possible to accurately ascertain the travel section of a vehicle due to falsification of information recorded in a vehicle-mounted device of the vehicle or powering off of the vehicle-mounted device.

Therefore, an object of the present invention is to provide a vehicle management system, a vehicle-mounted device, a vehicle management method, and a program which can solve the above problems.

Solution to Problem

According to a first aspect of the present invention, a vehicle management system includes a vehicle-mounted device and a vehicle management device, in which the vehicle-mounted device includes a vehicle identification unit that is configured to identify other vehicles from an image generated by photographing surroundings of a host vehicle using a photographing device, a reception information detector that is configured to detect identification information of the other vehicles on the basis of a signal received by inter-vehicle communication among vehicle-mounted devices of the other vehicles located within a communication range of the inter-vehicle communication, and a determination unit that is configured to determine whether identification information corresponding to the other vehicles identified from the image has been acquired.

In such a configuration, it is possible to ascertain a correspondence relationship between a vehicle identified by a photographing device and a vehicle identified based on information obtained by inter-vehicle communication.

In the vehicle management system described above, the vehicle-mounted device may include an image transmitter that is configured to transmit an image in which the identified other vehicles are reflected to the vehicle management device when the identification information corresponding to the other vehicles identified from the image cannot be acquired.

In such a configuration, it is possible to identify a vehicle having a vehicle-mounted device that does not perform inter-vehicle communication among vehicles photographed by a photographing device.

In addition, in the vehicle management system described above, the vehicle management device may further include a recording unit that is configured to record information on other vehicles whose identification information cannot be acquired as fraudulent vehicle candidates.

In such a configuration, it is possible to store an image indicating a vehicle having a vehicle-mounted device that does not perform inter-vehicle communication in a vehicle management device.

In addition, in the vehicle management system described above, the vehicle identification unit may identify other vehicles that are other vehicles traveling on an opposite lane from a plurality of images continuously acquired by a photographing device and are located within a communication range of the inter-vehicle communication and positional information of the other vehicles, the reception information detector may detect identification information of the other vehicles and the positional information detected by vehicle-mounted devices of the other vehicles based on a signal received by the inter-vehicle communication, and the determination unit may determine whether the identification information corresponding to other vehicles identified from the image has been acquired on the basis of a correspondence relationship between the positional information of identified other vehicles acquired from the plurality of images continuously acquired by the photographing device and the positional information detected by the reception information detector.

In such a configuration, it is possible to identify a vehicle having a vehicle-mounted device that does not perform inter-vehicle communication among vehicles which can be photographed by a photographing device.

According to a second aspect of the present invention, a vehicle-mounted device includes a vehicle identification unit configured to identify other vehicles from an image generated by photographing surroundings of a host vehicle using a photographing device, a reception information detector configured to detect identification information of the other vehicles on the basis of a signal received by inter-vehicle communication among vehicle-mounted devices of the other vehicles located within a communication range of the inter-vehicle communication, and a determination unit configured to determine whether identification information corresponding to the other vehicles identified from the image has been acquired.

In such a configuration, it is possible to ascertain a correspondence relationship between vehicles identified by a photographing device and vehicles identified based on information obtained by inter-vehicle communication.

According to a third aspect of the present invention, a vehicle management method in a vehicle management system having a vehicle-mounted device and a vehicle management device includes, by the vehicle-mounted device, identifying other vehicles from an image generated by photographing surroundings of a host vehicle using a photographing device, detecting identification information of the other vehicles on the basis of a signal received by inter-vehicle communication among vehicle-mounted devices of the other vehicles located within a communication range of the inter-vehicle communication, and determining whether identification information corresponding to the other vehicles identified from the image has been acquired.

In such a configuration, it is possible to ascertain a correspondence relationship between vehicles identified by a photographing device and vehicles identified based on information obtained by inter-vehicle communication.

According to a fourth aspect of the present invention, a program causes a computer of a vehicle-mounted device to function as a vehicle identifying unit that is configured to identify other vehicles from an image generated by photographing surroundings of a host vehicle using a photographing device, a reception information detecting unit that is configured to detect identification information of the other vehicles on the basis of a signal received by the inter-vehicle communication among vehicle-mounted devices of the other vehicles located within a communication range of the inter-vehicle communication, and a determination unit that is configured to determine whether identification information corresponding to the other vehicles identified from the image has been acquired.

In such a configuration, it is possible to ascertain a correspondence relationship between vehicles identified by a photographing device and vehicles identified based on information obtained by inter-vehicle communication.

Advantageous Effects of Invention

According to the present invention, it is possible to identify a vehicle having a vehicle-mounted device that does not perform inter-vehicle communication due to powering off or improper modification of the vehicle-mounted device.

DESCRIPTION OF EMBODIMENTS

Hereinafter, a vehicle management system, a vehicle-mounted device, a vehicle management device, a vehicle management method, and a program according to an embodiment of the present invention will be described with reference to the drawings.

Figure 1:
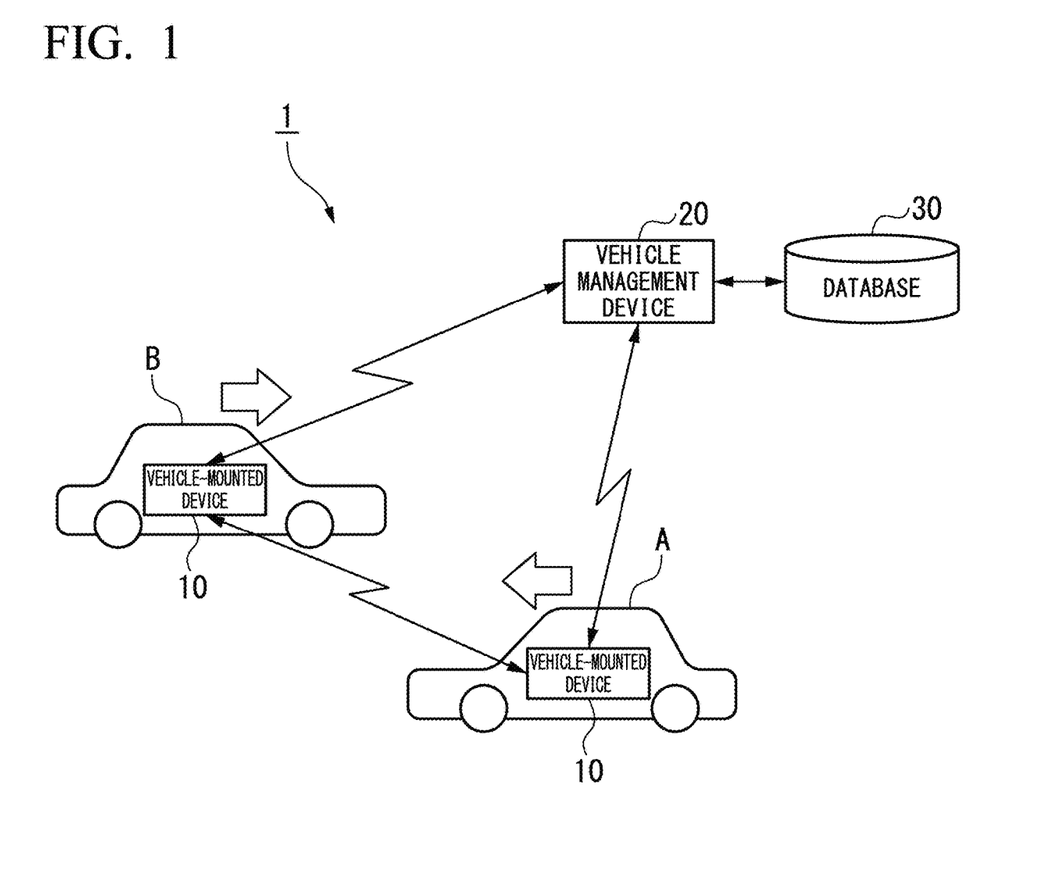
FIG. 1 is a diagram which shows an outline of a vehicle management system according to an embodiment of the present invention.

FIG. 1 is a diagram which shows an outline of the vehicle management system according to the present embodiment.

A vehicle management system 1 as shown in FIG. 1 is configured by connecting a vehicle-mounted device 10 provided in a vehicle and a vehicle management device 20 via a communication network. The vehicle-mounted device 10 is loaded onto each vehicle traveling on a road, such as a vehicle A and a vehicle B. The vehicle-mounted devices 10 of respective vehicles transmit or receive information by communicatively contacting each other when each is located within a communication range of the other vehicle-mounted devices. This communication is called inter-vehicle communication. In addition, each vehicle-mounted device 10 is communicatively connected to the vehicle management device 20 via a wireless communication network or a wired communication network. The vehicle management device 20 is installed in a remote building and transmits or receives information to or from the vehicle-mounted device 10. The vehicle management device 20 is communicatively connected to a database 30.

Figure 2:
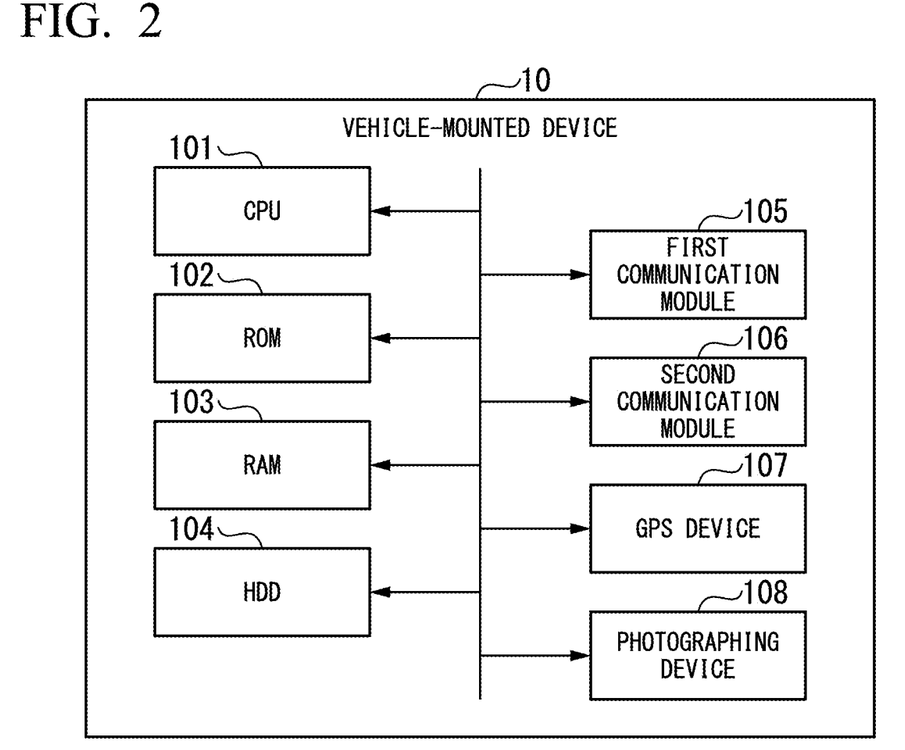
FIG. 2 is a hardware configuration diagram of a vehicle-mounted device according to the embodiment of the present invention.

FIG. 2 is a hardware configuration diagram of a vehicle-mounted device.

The vehicle-mounted device 10 as shown in FIG. 2 is a computer having hardware constituents such as a central processing unit (CPU) 101, a read only memory (ROM) 102, a random access memory (RAM) 103, a hard disk drive (HDD) 104, a first communication module 105, a second communication module 106, a global positioning system (GPS) device 107, and a photographing device 108. The first communication module 105 is hardware that performs inter-vehicle communication. The second communication module 106 is hardware that performs communication with the vehicle management device 20.

Figure 3:
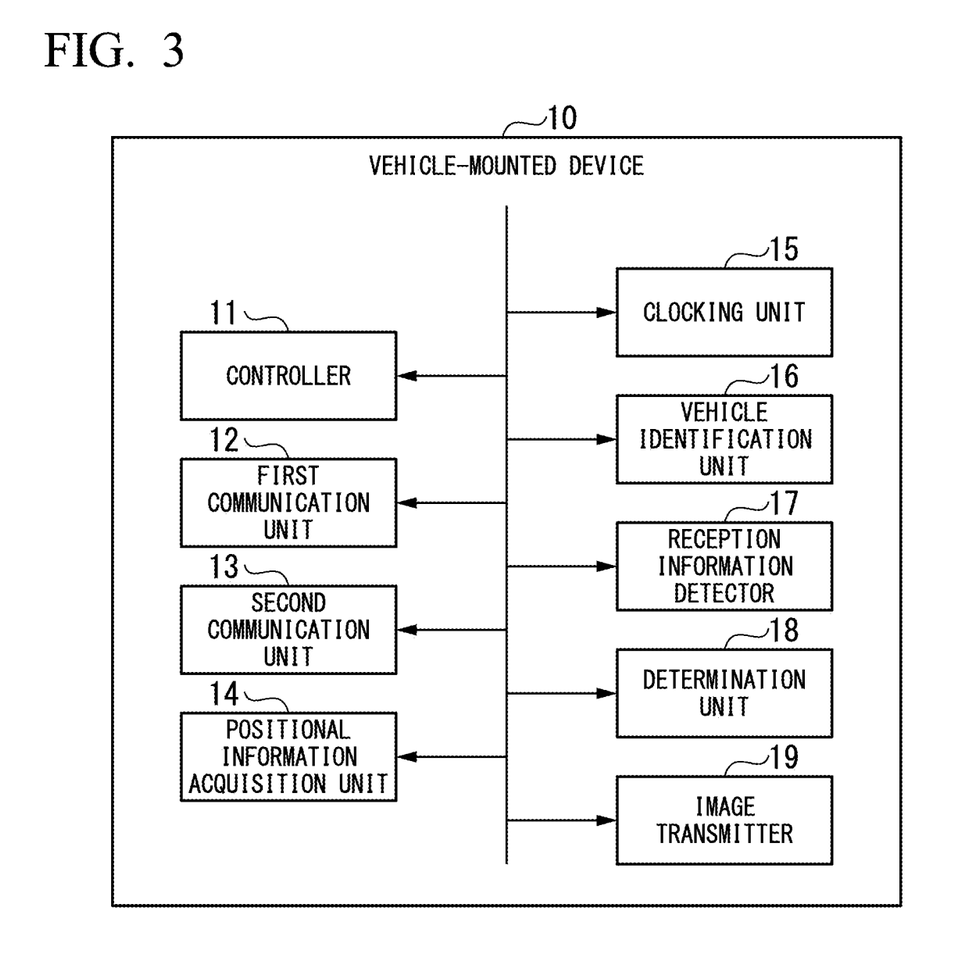
FIG. 3 is a functional block diagram of the vehicle-mounted device according to the embodiment of the present invention.

FIG. 3 is a functional block diagram of the vehicle-mounted device according to the present embodiment.

The CPU of the vehicle-mounted device 10 executes a program recorded in the ROM 102 and the like if power is applied by starting a host vehicle. As a result, the vehicle-mounted device 10 includes respective functional constituents such as a controller 11, a first communication unit 12, a second communication unit 13, a positional information acquisition unit 14, a clocking unit 15, a vehicle identification unit 16, a reception information detector 17, a determination unit 18, and an image transmitter 19.

The controller 11 controls other functional units in the vehicle-mounted device 10.

The first communication unit 12 performs inter-vehicle communication with vehicle-mounted devices 10 of other vehicles via the first communication module 105.

The second communication unit 13 performs communication processing with the vehicle management device 20 via the second communication module 106.

The positional information acquisition unit 14 acquires positional information from the GPS device 107 provided in the vehicle-mounted device 10.

The clocking unit 15 is a processor that measures a date and time.

The vehicle identification unit 16 identifies other vehicles from an image generated by photographing surroundings of the host vehicle using the photographing device 108 such as a camera.

The reception information detector 17 receives a signal according to inter-vehicle communication from the vehicle-mounted devices 10 of other vehicles located within a communication range of the inter-vehicle communication. The reception information detector 17 detects at least IDs corresponding to the other vehicles based on the received information.

The determination unit 18 determines whether the IDs corresponding to the other vehicles identified from the image have been acquired. The determination unit 18 may determine whether other types of identification information that can identify the other vehicles has been acquired on the basis of information other that the IDs corresponding to the other vehicles.

When the IDs corresponding to the other vehicles identified from the image cannot be acquired on the basis of the inter-vehicle communication among the other vehicles, the image transmitter 19 transmits an image in which the other vehicles are reflected to the vehicle management device 20.

Figure 4:
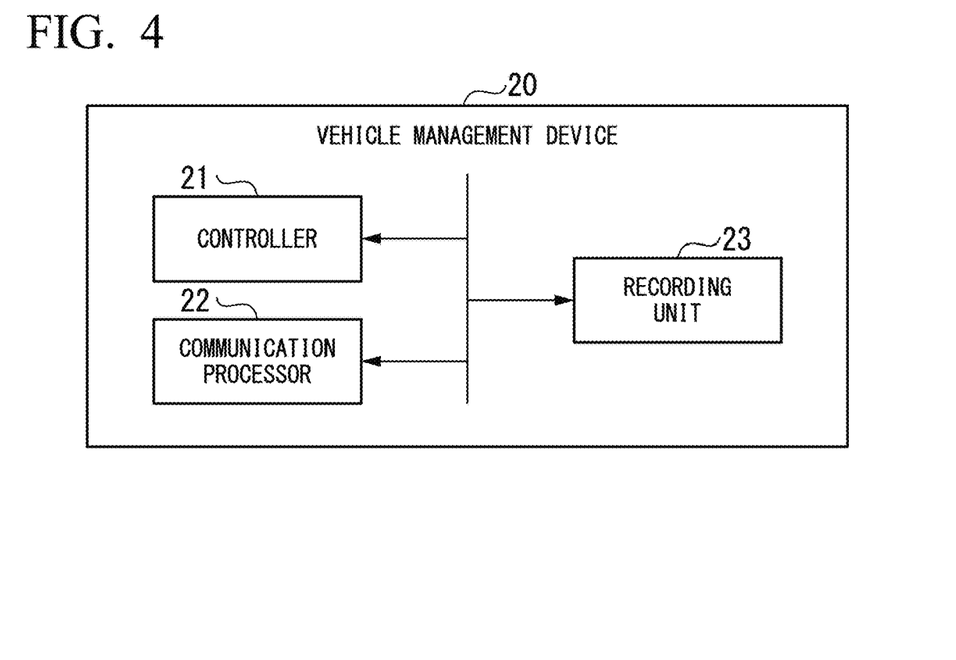
FIG. 4 is a functional block diagram of a vehicle management device according to the embodiment of the present invention.

FIG. 4 is a functional block diagram of the vehicle management device according to the present embodiment.

A CPU of the vehicle management device 20 executes a program recorded in the ROM 102 or the like. As a result, the vehicle management device 20 includes respective functional constituents such as a controller 21, a communication processor 22, and a recording unit 23.

The recording unit 23 of the vehicle management device 20 records information on other vehicles whose IDs cannot be acquired among other vehicles reflected in an image received from the vehicle-mounted device 10 as fraudulent vehicle candidates.

The vehicle management device 20, like the vehicle-mounted device 10, is also a computer having hardware constituents such as a CPU, a ROM, a RAM, an HDD, and a communication module.

In the present embodiment, it is assumed that respective vehicles have vehicle-mounted devices that perform inter-vehicle communication with each other when the vehicles pass by each other. Then, with each constituent described above, the vehicle management device 20 records a vehicle corresponding to a vehicle having a vehicle-mounted device that cannot receive information of inter-vehicle communication from a vehicle passing thereby as a fraudulent vehicle candidate even though the vehicles have passed by each other. As a result, the vehicle management device 20 identifies a vehicle having a vehicle-mounted device that does not perform inter-vehicle communication due to powering off or improper modification of the vehicle-mounted device 10.

Figure 5:
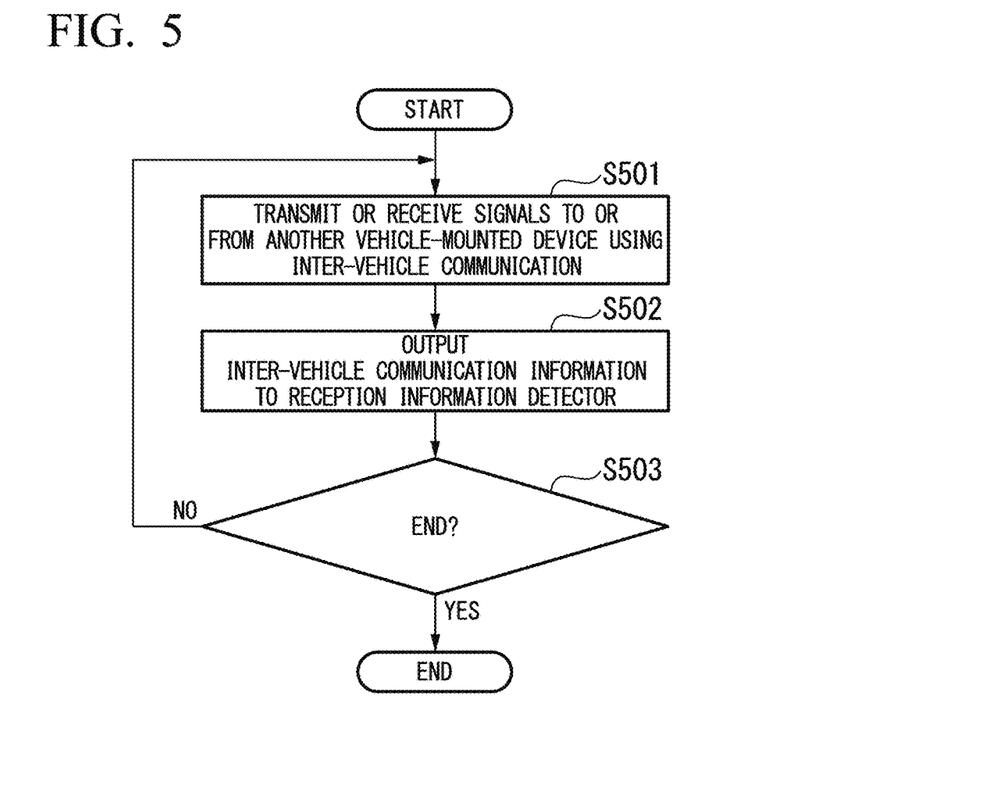
FIG. 5 is a first diagram which shows a processing flow of the vehicle-mounted device according to the embodiment of the present invention.

FIG. 5 is a first diagram which shows a processing flow of the vehicle-mounted device according to the embodiment.

Hereinafter, processing of a vehicle-mounted device 10A included in the vehicle A will be described. The vehicle-mounted device 10 provided in the vehicle B is referred to as a vehicle-mounted device 10B. When the vehicle A passes by the vehicle B after the vehicle-mounted device 10A is started, the vehicle-mounted device 10B of the vehicle B enters a communication range of the vehicle-mounted device 10A. As a result, the first communication unit 12 of the vehicle-mounted device 10A transmits or receives signals to or from the vehicle-mounted device 10B using inter-vehicle communication via the first communication module 105 (step S501). The signals transmitted to the vehicle-mounted device 10B using the inter-vehicle communication by the first communication unit 12 include at least an ID of the vehicle-mounted device 10A and current positional information of the vehicle A. The positional information is positional information acquired from the GPS device provided in the vehicle A by the positional information acquisition unit 14. The positional information is information on coordinates on a ground such as latitude, longitude, and altitude. The signals received by the first communication unit 12 of the vehicle-mounted device 10A from the vehicle-mounted device 10B via the first communication module 105 also include the ID of the vehicle-mounted device 10B and the positional information of the vehicle B. Note that each of the vehicle-mounted device 10A and the vehicle-mounted device 10B may transmit only its own ID to the other vehicle-mounted device. In this case, the vehicle-mounted device which has received the ID may acquire the positional information from its own GPS 107.

The first communication unit 12 acquires a date and time measured by the clocking unit 15 at the time of receiving a signal. This date and time information indicates a communication time. If transmission or reception of a signal is completed using inter-vehicle communication, the first communication unit 12 outputs the inter-vehicle communication information including information included in a received signal and the communication time acquired by the clocking unit 15 at the time of receiving the signal to the reception information detector 17 (step S502).

The vehicle-mounted device 10A determines whether to stop the processing (step S503). When the controller 11 of the vehicle-mounted device 10A does not stop the processing, the processing of step S501 and step S502 is repeated. As a result, the vehicle-mounted device 10A performs inter-vehicle communication with the vehicle-mounted devices 10B of many other vehicles B approaching and passing by the vehicle A, and outputs the inter-vehicle communication information to the reception information detector 17 each time.

Figure 6:
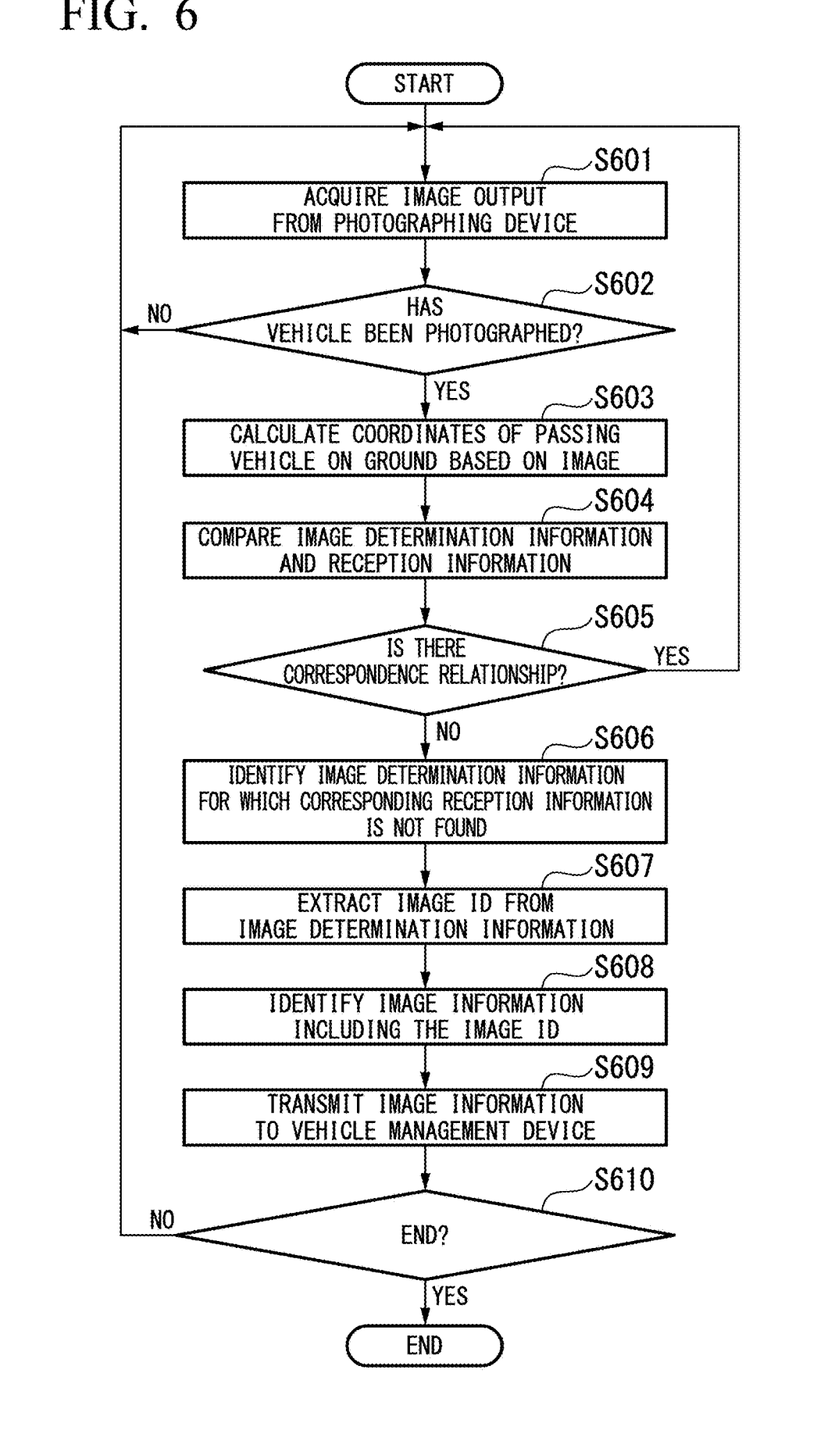
FIG. 6 is a second diagram which shows the processing flow of the vehicle-mounted device according to the embodiment of the present invention.

FIG. 6 is a second diagram which shows the processing flow of the vehicle-mounted device according to the present embodiment.

FIG. 6 is a diagram which describes a flow of an image transmission processing performed by a vehicle-mounted device 10.

The controller 11 of the vehicle-mounted device 10A provided in the vehicle A instructs the photographing device 108 to start photographing after it is driven. The photographing device 108 performs photographing continuously on the basis of the instruction to start photographing. For example, the photographing device 108 may photograph several times or more per second. The photographing device 108 has a fixed angle of view to photograph the vehicle B passing by on an opposite lane in front of the vehicle A. The photographing device 108 outputs image data generated by the photographing to the vehicle-mounted device 10A.

The vehicle identification unit 16 of the vehicle-mounted device 10 sequentially acquires images output by the photographing device 108 (step S601). Whenever the vehicle identification unit 16 acquires an image, it determines whether a vehicle has been photographed by analyzing the image (step S602). The vehicle identification unit 16 performs the determination according to pattern recognition processing that performs determination on whether the passing vehicle B is reflected in the image by, for example, comparing a pattern of an object photographed in the image with an image pattern representing a vehicle stored in advance. When a vehicle B traveling and passing by on an opposite lane is reflected in the image, the vehicle identification unit 16 calculates coordinates of the vehicle B on the ground on the basis of a position of the vehicle B in the image and coordinates of the vehicle A on the ground obtained from the GPS device 107 of the vehicle A (step S603). The vehicle identification unit 16 detects a relative position with respect to the vehicle A on the basis of the position of the vehicle B in the image. The vehicle identification unit 16 can estimate the coordinates of the vehicle B on the ground on the basis of the coordinates of the vehicle A on the ground and the relative positive of the vehicle B with respect to the vehicle A. The vehicle identification unit 16 outputs image information including the image, an image ID for identifying the image, and a photographing time of the image to the image transmitter 19 when it is determined that a vehicle has been photographed in the image. In addition, the vehicle identification unit 16 outputs image determination information including the photographing time, the image ID, and the coordinates of the vehicle B on the ground photographed in the image to the determination unit 18.

The reception information detector 17 acquires inter-vehicle communication information including information included in a signal received from the vehicle B traveling on an opposite lane and a reception time from the first communication unit 12 according to the inter-vehicle communication performed by the first communication module 105. The reception information detector 17 detects the coordinates of the vehicle B on the round and an ID of the vehicle B included in the inter-vehicle communication information. The reception information detector 17 outputs reception information including the ID and coordinates of the vehicle B on the ground and the reception time included in the inter-vehicle communication information to the determination unit 18.

The determination unit 18 acquires the image determination information and the reception information. The determination unit 18 compares the photographing time and the coordinates of the vehicle B included in the image determination information with the reception time and the coordinates of the vehicle B included in the reception information (step S604). The determination unit 18 determines a presence or absence of a correspondence relationship between the image determination information generated by photographing the vehicle B and the reception information generated on the basis of a signal received from the vehicle B (step S605). The determination unit 18 determines that the compared image determination information and reception information correspond to each other if a difference between the photographing time and the reception time is equal to or less than an allowed difference and a distance between the coordinates included in respective types of information is equal to or less than an allowed distance on the basis of the comparison between the image determination information and the reception information. The determination unit 18 identifies image determination information for which corresponding reception information is not found (step S606). The determination unit 18 extracts an image ID from the image determination information for which corresponding reception information is not found (step S607). The determination unit 18 outputs the image ID to the image transmitter 19. Note that the processing from step S604 to step S607 described above is one mode of processing for determining whether an ID corresponding to the vehicle B identified from the image has been acquired.

When the image transmitter 19 acquires the image ID from the determination unit 18, it identifies image information including the image ID among the image information acquired from the vehicle identification unit 16 (step S608). The image transmitter 19 transmits the identified image information to the vehicle management device 20 (step S609). The transmission of the image information by the image transmitter 19 may be performed at a predetermined timing. For example, the predetermined timing may be a timing after a predetermined period of repetition has elapsed, a timing at which a predetermined amount of identified image information is accumulated, a timing at which communication connection to a roadside device that is installed in a roadside strip and relays communication with the vehicle management device 20 can be made, or the like. The controller 11 of the vehicle-mounted device 10 determines whether to end the processing (step S610). The controller 11 repeats the processing from step S601 when the processing is not ended.

The vehicle management device 20 receives image information transmitted in step S609. The vehicle management device 20 records the image information in the database 30 as an image in which a vehicle that can be a fraudulent vehicle candidate is photographed.

A fee calculation device can calculate a fee for a travel section of a vehicle by detecting a travel route based on a position of the vehicle obtained by a mechanism such as a GPS even if a roadside device is not provided in a roadside strip of a lane. However, it may not be possible to accurately ascertain the travel section of a vehicle due to falsification of information recorded in a vehicle-mounted device of the vehicle, powering off of the vehicle-mounted device, or the like. The vehicle-mounted device 10A of the vehicle A identified according to the present embodiment can transmit information of a vehicle which can be photographed by the photographing device 108 of the vehicle A, but has a vehicle-mounted device that does not perform inter-vehicle communication among vehicles B traveling and passing by on an opposite lane to the vehicle management device 20. Therefore, the vehicle management device 20 can identify a vehicle having a vehicle-mounted device that does not perform inter-vehicle communication from an image.

In addition, the vehicle management device 20 can identify a vehicle by analyzing image information transmitted from the vehicle-mounted device 10. For example, the vehicle management device 20 identifies a vehicle number by analyzing a license plate of the vehicle and identifies a travel section within a fee-charging section in which the vehicle has actually traveled, thereby calculating a correct travel fee to be applied to this vehicle on the basis of a relationship between the travel section and the fee-charging section.

Note that, when the vehicle-mounted device 10 transmits image information to be transmitted, it may store coordinates detected by the GPS device 107 of a host device and transmit the image information. The vehicle management device 20 may extract the coordinates from respective types of the image information of specific vehicles sequentially sent from a plurality of vehicles, and may identify the travel section of a vehicle having a vehicle-mounted device that does not perform inter-vehicle communication on the basis of a plurality of these coordinates.

Each device described above has a computer system inside. Then, the process of the processing described above is stored in a computer-readable recording medium in a form of a program, and the processing is performed by a computer reading and executing this program. Here, the computer-readable recording medium refers to a magnetic disk, a magneto-optical disk, a CD-ROM, a DVD-ROM, a semiconductor device, or the like. In addition, this computer program may be distributed to a computer via a communication line, and the computer that has received this distribution may execute the program.

REFERENCE SIGNS LIST

1 Vehicle management system
10 Vehicle-mounted device
11 Controller
12 First communication unit
13 Second communication unit
14 Positional information acquisition unit
15 Clocking unit
16 Vehicle identification unit
17 Reception information detector
18 Determination unit
19 Image transmitter
20 Vehicle management device
21 Controller
22 Communication processor
23 Recording unit
30 Database
101 CPU
102 ROM
103 RAM
104 HDD
105 First communication module
106 Second communication module
107 GPS device
108 Photographing device

What is claimed is:

1. A vehicle management system in which
a vehicle-mounted device mounted on a vehicle is configured to carry out an inter-vehicle communication with a counterpart vehicle-mounted device mounted on an other vehicle while communicating with a vehicle management device,
wherein the vehicle-mounted device comprises:
a vehicle identification unit configured to calculate first coordinates of the other vehicle on a ground based on coordinates of the vehicle on the ground and a position of the other vehicle in an image which is photographed by a photographing device with an angle of view set to photography the other vehicle approaching the vehicle, thus generating image determination information including the coordinates of the other vehicle;
a reception information detector configured to generate reception information comprising identification information and second coordinates of the other vehicle which are detected based on a signal received by the inter-vehicle communication;
a determination unit configured to determine whether the image determination information associates with the reception information in terms of the first and second coordinates of the other vehicle, thus specifying the image determination information not associated with the reception information; and
an image transmitter configured to transmit the image of the other vehicle to the vehicle management device based on the image determination information specified by the determination unit,
whereby the vehicle management device is configured to record the other vehicle as a fraudulent vehicle candidate.

2. A vehicle-mounted device configured to carry out an inter-vehicle communication with a counterpart vehicle-mounted device mounted on an other vehicle approaching a vehicle while communicating with a vehicle management device, said vehicle-mounted device mounted on the vehicle comprising:
a vehicle identification unit configured to calculate first coordinates of the other vehicle on a ground based on coordinates of the vehicle on the ground and a position of the other vehicle in an image which is photographed by a photographing device with an angle of view set to photography the other vehicle approaching the vehicle, thus generating image determination information including the coordinates of the other vehicle;
a reception information detector configured to generate reception information comprising identification information and second coordinates of the other vehicle which are determined based on a signal received by the inter-vehicle communication;
a determination unit configured to determine whether the image determination information associates with the reception information in terms of the first and second coordinates of the other vehicle, thus specifying the image determination information not associated with the reception information; and
an image transmitter configured to transmit the image of the other vehicle to the vehicle management device based on the image determination information specified by the determination unit.

3. A vehicle management method adapted to a vehicle management system in which a vehicle-mounted device mounted on a vehicle is configured to carry out an inter-vehicle communication with a counterpart vehicle-mounted device mounted on an other vehicle while communicating with a vehicle management device, said vehicle management method implemented:
by the vehicle-mounted device is configured to
calculate first coordinates of the other vehicle on a ground based on coordinates of the vehicle on the ground and a position of the other vehicle in an image which is photographed by a photographing device with an angle of view set to photography the other vehicle approaching the vehicle, thus generating image determination information including the coordinates of the other vehicle;
generate reception information comprising identification information and second coordinates of the other vehicle based on a signal received by the inter-vehicle communication;
determine whether the image determination information associates with the reception information in terms of the first and second coordinates of the other vehicle, thus specifying the image determination information not associated with the reception information; and
transmit the image of the other vehicle to the vehicle management device based on the specified image determination information, by the vehicle management device configured to record the other vehicle as a fraudulent vehicle candidate.

4. In a vehicle management system in which a vehicle-mounted device mounted on a vehicle is configured to carry out an inter-vehicle communication with a counterpart vehicle-mounted device mounted on an other vehicle while communicating with a vehicle management device, a non-transitory computer-readable storage medium having stored therein a program causing a computer of the vehicle-mounted device to calculate first coordinates of the other vehicle on a ground based on coordinates of the vehicle on the ground and a position of the other vehicle in an image which is photographed by a photographing device with an angle of view set to photography the other vehicle approaching the vehicle, thus generating image determination information comprising the coordinates of the other vehicle, generate reception information comprising identification information and second coordinates of the other vehicle based on a signal received by the inter-vehicle communication, the image determination information associates with the reception information in terms of the first and second coordinates of the other vehicle, thus specifying the image determination information not associated with the reception information, and transmit the image of the other vehicle to the vehicle management device based on the specified image determination information.

\* \* \* \* \*